(12) United States Patent
Fairbourn

(10) Patent No.: US 8,137,820 B2
(45) Date of Patent: Mar. 20, 2012

(54) ROUGHENED COATINGS FOR GAS TURBINE ENGINE COMPONENTS

(75) Inventor: David C. Fairbourn, Sandy, UT (US)

(73) Assignee: MT Coatings, LLC, Cincinnati, OH (US)

( * ) Notice: Subject to any disclaimer, the term of this patent is extended or adjusted under 35 U.S.C. 154(b) by 937 days.

(21) Appl. No.: 12/093,980

(22) PCT Filed: Feb. 24, 2006

(86) PCT No.: PCT/US2006/006644
§ 371 (c)(1),
(2), (4) Date: May 16, 2008

(87) PCT Pub. No.: WO2007/106065
PCT Pub. Date: Sep. 20, 2007

(65) Prior Publication Data
US 2008/0273985 A1 Nov. 6, 2008

(51) Int. Cl.
B32B 15/16 (2006.01)
F01D 5/14 (2006.01)

(52) U.S. Cl. ..... 428/687; 428/621; 428/650; 416/241 R; 416/241 B

(58) Field of Classification Search ............... 427/256, 427/258, 459, 260, 261, 262, 286, 327, 328, 427/404, 405; 428/615, 621, 622, 687; 416/241 R, 416/241 B
See application file for complete search history.

(56) References Cited

U.S. PATENT DOCUMENTS

| 5,076,897 | A | * | 12/1991 | Wride et al. | 205/110 |
| 5,437,737 | A | * | 8/1995 | Draghi et al. | 148/23 |
| 6,183,888 | B1 | | 2/2001 | Alperine et al. | |
| 6,468,669 | B1 | * | 10/2002 | Hasz et al. | 428/553 |
| 6,541,075 | B2 | * | 4/2003 | Hasz et al. | 427/454 |
| 7,614,847 | B2 | * | 11/2009 | Nelson et al. | 415/173.4 |
| 2003/0035968 | A1 | | 2/2003 | Anderson et al. | |
| 2004/0166355 | A1 | * | 8/2004 | Lee et al. | 428/553 |
| 2005/0271514 | A1 | | 12/2005 | Lee et al. | |

FOREIGN PATENT DOCUMENTS

| EP | 0844368 A2 | 5/1998 |
| EP | 0848079 A1 | 6/1998 |
| EP | 1803896 A2 | 7/2007 |
| WO | 9924647 A1 | 5/1999 |

* cited by examiner

Primary Examiner — Jennifer McNeil
Assistant Examiner — Daniel J Schleis
(74) Attorney, Agent, or Firm — Wood, Herron & Evans, LLP

(57) ABSTRACT

A gas turbine engine component (10) with an aluminide coating (42) on at least a portion of an airflow surface (18) that includes a roughening agent (44) effective to provide a desired surface roughness and a deposition process for forming such aluminide coatings (42). A layer (40) including a binder (38) and the roughening agent (44) maybe applied to the superalloy substrate (46) of the component (10) and the aluminide coating (42) formed on the airflow surface portion by exposing the component (10) and layer (40) to an appropriate deposition environment. Suitable roughening agents include metal and ceramic particles (44) that are dispersed on the airflow surface portion before exposure to the deposition environment. The particles (44), which are substantially intact after the aluminide coating (42) is formed, are dispersed in an effective number to supply the desired surface roughness.

20 Claims, 3 Drawing Sheets

ROUGHENED COATINGS FOR GAS TURBINE ENGINE COMPONENTS

FIELD OF THE INVENTION

The present invention relates to coated metal components and, more particularly, gas turbine engine components with a roughened coating and methods of forming such roughened coatings on gas turbine engine components.

BACKGROUND OF THE INVENTION

Intermetallic layers and coatings are often formed on a surface of a metal component to protect the underlying metal substrate of the component and to extend its useful life during operation. For example, many superalloy components in gas turbine engines, like turbine blades, vanes, and nozzle guides, include an aluminide coating on airflow surfaces that protects the underlying superalloy base metal from high temperature oxidation and corrosion. Among other applications, gas turbine engines are used as aircraft or jet engines, such as turbofans. Gas turbine engines are also used in electromotive power generation equipment, such as industrial gas turbine engines, to generate electricity, and as power plants providing motive forces to propel vehicles.

Generally, gas turbine engines include a compressor for compressing air, a combustor for mixing the compressed air with fuel, such as jet fuel or natural gas, and igniting the mixture, and a turbine blade assembly for producing power. In particular, gas turbine engines operate by drawing air into the front of the engine. The air is then compressed, mixed with fuel, and combusted. Hot exhaust gases from the combusted mixture pass through a turbine, which causes the turbine to spin about an axial center and thereby powers the compressor. Aircraft gas turbine engines, referred to herein as jet engines, propel the attached aircraft in response to the thrust provided by the flow of the hot exhaust gases from the gas turbine engine. Rotation of the turbine in industrial gas turbine engines generates electrical power and motive power for vehicles.

Gas turbine engines include turbine blades shaped as airfoils and coupled to the turbine. The hot exhaust gases from the combustor flow over and under each turbine blade. Because of the airfoil shape, the flow path across the top of the airfoil or convex side is much longer than the flow path underneath the concave side of the turbine blade. The result is an aerodynamic lift, which drives each of the turbine blades in the desired direction. Work is then extracted from the coordinated rotation of the turbine blades about the axial center of the gas turbine.

Conventional approaches for optimizing aerodynamic lift generated by the spinning turbine blades rely on increasingly radical airfoil shapes and three-dimensional topologies. However, these conventional approaches that focus solely upon advances in component geometry introduce complexity into the component manufacture process and are ultimately limited in the improvement in aerodynamic efficiency.

Accordingly, there is a need for gas turbine engine components with improved lift and methods of forming such gas turbine engine components that avoids the necessity of a complex airfoil shape.

SUMMARY OF INVENTION

The present invention provides, in one aspect, an airflow surface of a gas turbine engine component is at least partially covered with an aluminide coating including an effective number of substantially-intact particles dispersed therein such that the aluminide coating has a desired or targeted surface roughness. The gas turbine engine component is formed from a superalloy material, such as a nickel-based superalloy. The gas turbine engine component may be a turbine blade for a gas turbine engine and, in particular, a jet engine turbine blade for a jet turbine engine.

Advantageously, the aluminide coating on the airflow surface portion may be formed by a deposition process that includes dispersing the particles on at least the portion of the airflow surface and then forming the aluminide coating that includes the dispersed particles in a substantially intact condition and in an effective number such that the aluminide coating has a desired or targeted surface roughness. The method may include applying a layer containing silicon and the particles, such as a mixture of silane and either ceramic or metallic particles, to at least the portion of the airflow surface. After applying the layer, the gas turbine engine component is exposed to a deposition environment effective to form the aluminide coating with the dispersed particles. One suitable deposition environment relies on vaporizing a donor material including a metal effective to form the aluminide layer, which includes the metal from the donor material, silicon from the layer, and the particles from the layer.

The surface finish of the present invention deviates from conventional turbine blade designs that want the surface finishes on the entire airflow surface to be substantially identical. In contrast, the present invention provides a surface finish on one portion of the airflow surface (i.e., the convex airflow surface found on most gas turbine blades) that differs from the surface finish on another portion of the air flow surface (e.g., the opposite concave airflow surface found on most gas turbine blades).

The surface finish of the present invention deviates from conventional turbine blade designs that specify the turbine blades to be as smooth as possible to contribute to laminar flow and to optimize the flow of hot exhaust gases beneath the concave portion of the airflow surface of the turbine blade. Typically, a desired surface roughness ($R_A$) for the surface finishes of the convex and concave portions of the airflow surface is less than about 68 microinches, after aluminiding. In contrast, the present invention advantageously applies an aluminide coating to the convex airflow surface portion that increases the surface roughness above this conventional desired value. The concave airflow surface portion may have a conventional surface roughness but, in any event, has a smoother surface than all or part of the convex airflow surface portion. The difference in surface roughness slows the airflow velocity across the convex airflow surface portion in comparison to the airflow velocity across the concave airflow surface portion.

The present invention improves the aerodynamic efficiency of gas turbine engine components providing aerodynamic lift without the need for complex component geometries and/or improves the aerodynamic lift in components having complex geometries beyond the gains provided solely by the geometry.

These and other benefits and advantages of the present invention shall be made apparent from the accompanying drawings and description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

DETAILED DESCRIPTION OF PREFERRED EMBODIMENTS

Figure 1:
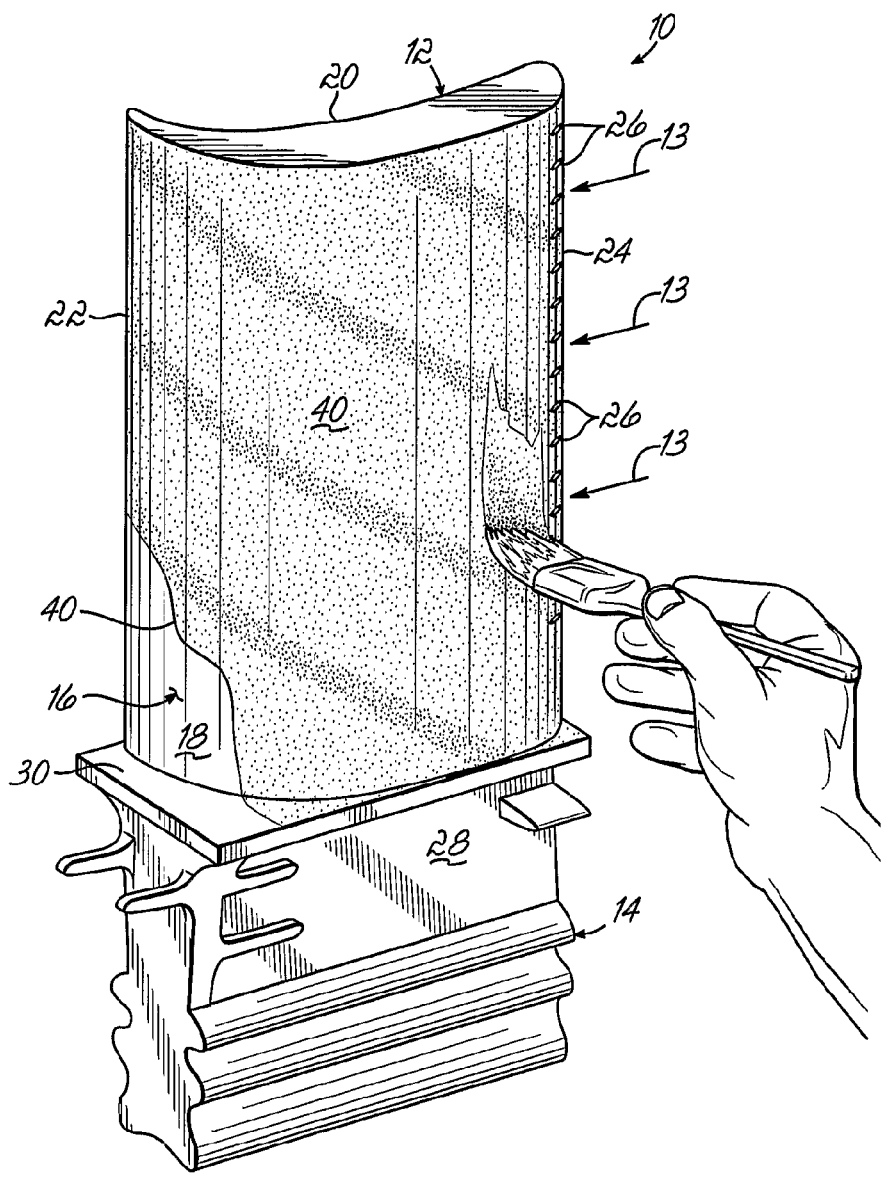
FIG. 1 is a perspective view of a gas turbine engine component with a liquid being applied to a portion of the gas turbine engine component in accordance with the principles of the present invention.

With reference to FIG. 1 and in accordance with the principles of the present invention, a gas turbine engine component 10, in a representative construction, includes an airfoil segment 12 designed to be in the high-pressure, hot airflow path (as indicated by arrows 13). Integral with airfoil segment 12 is a root 14 used to secure gas turbine engine component 10 to the turbine disk (not shown) of the gas turbine engine (not shown). The airfoil segment 12 is fabricated from any suitable nickel-, cobalt-, or iron-based high temperature superalloy from which such gas turbine engine components 10 are commonly made. The base element, typically nickel or cobalt, is by weight the single greatest element in the superalloy. For example, where the component 10 is a gas turbine component in a jet engine, segment 12 may be the nickel-based superalloy Inconel 795 Mod 5A or CMSX-4. The present invention is, however, not intended to be limited to any particular gas turbine engine component 10, and may be any high pressure turbine blade, low pressure turbine blade, or any other component of a gas turbine having an airfoil surface that generates lift while operating in a jet engine or while operating in an industrial gas turbine engine.

A surface 16 of the airfoil segment 12 of gas turbine engine component 10 is divided into airflow surfaces 18, 20 extending between a curved tip edge 22 and a curved foil tip edge 24. Cooling channels or passages internal to airfoil segment 12 include surface cooling holes 26 on surface 16 so as to permit cooling air to pass through the interior of airfoil segment 12 while gas turbine engine component 10 is in service on the gas turbine engine. The root 14 includes a contoured surface 28 extending beneath a platform 30 and is separated from the airfoil segment 12 by the platform 30.

Depending upon the use of the gas turbine engine component 10, combustion gases in the airflow path 13 may have a temperature as high as 3000° F. This promotes heating of the airfoil segment 12. Gas cooling of the airfoil segment 12 limits operating temperatures to 1800° F. or less. When the gas turbine engine component 10 is in service, portions of the component 10 below the platform 30 are cooler than the airfoil segment 12 and, frequently, are at an operating temperature of less than 1500° F. when the component 10 is in service. The cooler portions include the root 14, which is coupled with an air-cooled turbine disk of the gas turbine.

Airflow surface 20 has a concave shape extending between leading edge 22 and trailing edge 24 and airflow surface 18 has a convex shape extending between edges 22 and 24. When the gas turbine engine component 10 is coupled with a gas turbine engine (not shown) and rotated, leading edge 22 is the first to encounter the hot exhaust gases and air in the airflow path 13. The airflow path 13 will split at edge 22. A portion of the hot exhaust gases and air in air flow path 13 will flow across airflow surface 18 and another portion of the hot exhaust gases and air will flow across airflow surface 20. Due to the difference in curvature and length, the flow velocity will be greater across airflow surface 18 than across airflow surface 20. Due to the familiar Bernoulli's principle, lift is generated because the pressure is greater near airflow surface 20 than near airflow surface 18. The split airflow recombines after passing trailing edge 24.

Figure 1A:
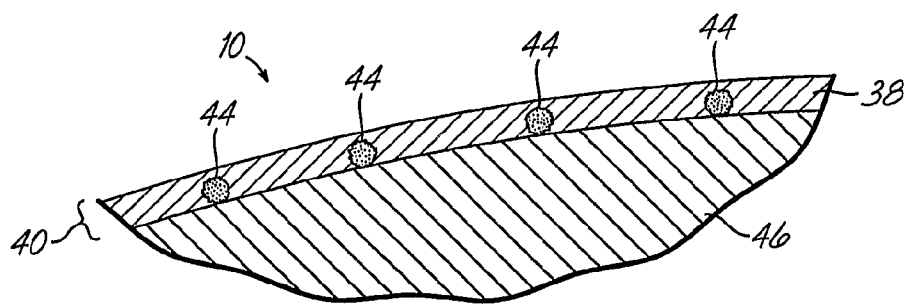
FIG. 1A is a diagrammatic cross-sectional view of a portion of the coated gas turbine engine component of FIG. 1.
Figure 2:
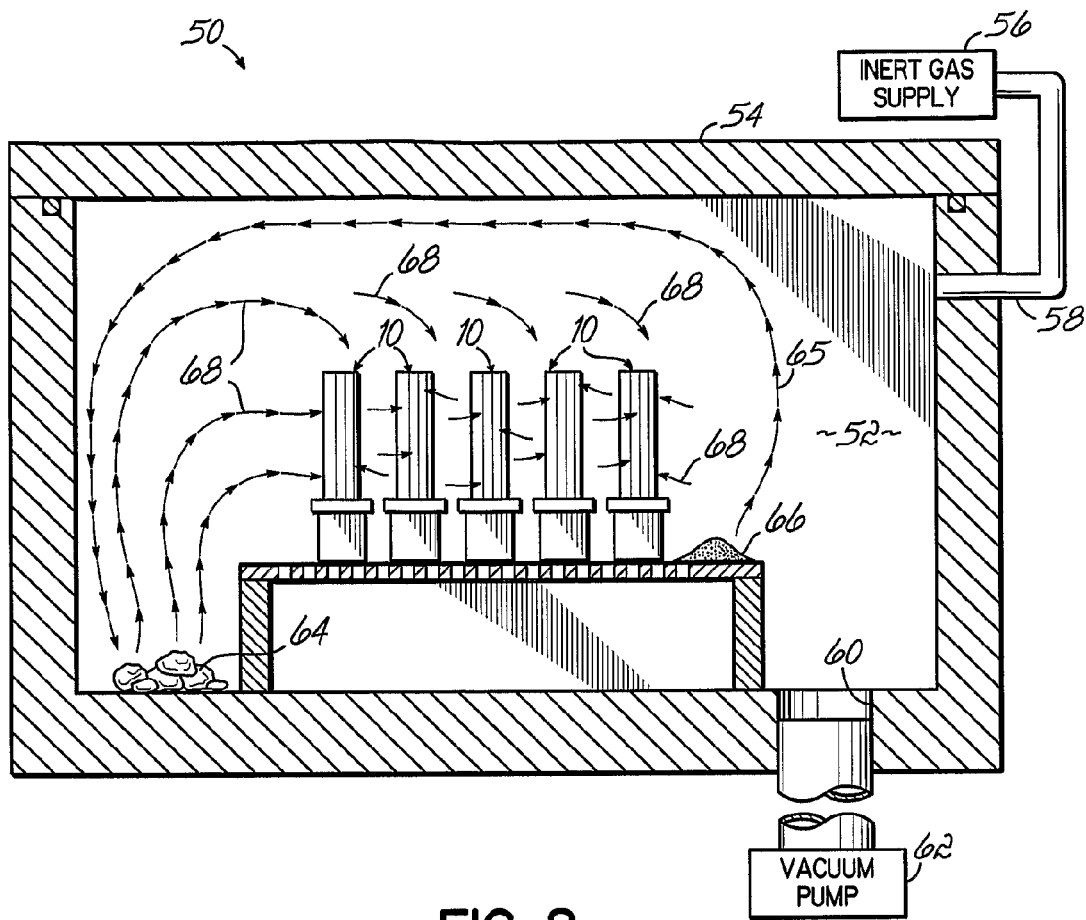
FIG. 2 is a schematic view showing gas turbine engine components, such as that from FIG. 1, in a deposition environment of a simple CVD deposition system for purposes of explaining the principles of the present invention.

With reference to FIGS. 1 and 1A, a layer 40 is applied to all or a portion of convex airflow surface 18 of gas turbine engine component 10 before an aluminide coating 42 (FIG. 4) is formed on selected regions of convex airflow surface 18 in a CVD apparatus 50 (FIG. 2). The layer 40 may be applied as a liquid or solution and then dried to remove solvent and form a solid or semi-solid coating on the gas turbine engine component 10 before aluminiding occurs.

The layer 40 is applied to all or a portion of convex airflow surface 18, such as by hand application with a paintbrush B or another type of conventional applicator recognized by a person having ordinary skill in the art. Alternatively, gas turbine engine component 10 may be sprayed with a suitable liquid or solution before drying and aluminiding. Thereafter, the coated gas turbine engine component 10 (which may advantageously first be dried and heated) is placed into a deposition environment 52 (FIG. 2) whereupon the aluminide coating 42 will be formed on convex airflow surface 18 to the desired thickness.

The layer 40 applied to all or a portion of the convex airflow surface 18 is initially a liquid or solution that includes a binder 38 and a roughening agent, such as inorganic particles 44, blended with the binder 38. The liquid forming the binder 38 may be a silicon-containing binder such as a silane and, advantageously, may be a high-viscosity silane. Silanes suitable for use in the present invention may have mono-, bis-, or tri-functional trialkoxy silane. The silane may be a bifunctional trialkoxy silyl, preferably trimethoxy, or triethoxy silyl groups. Amino silanes may also be used, although thio silanes may not be desired due to their sulfur content. Bisfunctional silane compounds are well known, and two suitable for use in the present invention are bis(triethoxysilyl)ethane and bis(trimethoxysilyl) methane. In both of these compounds, the bridging group between the two silane moieties is an alkyl group. Additional commercially available silanes include, but are not limited to, 1,2-Bis(tetramethyldisoloxanyl) Ethane
1,9-Bis(triethoxysilyl) Nonane
Bis(triethoxysilyl) Octane
Bis(trimethoxysilyl Ethane
1,3-Bis(trimethylsiloxy)-1,3-Dimethyl Disiloxane
Bis(trimethylsiloxy) Ethylsilane
Bis(trimethylsiloxy) Methylsilane
A1-501 available from AG Chemetall (Frankfurt Germany)

The silane of binder 38 may be neat, in an aqueous solution, or in an aqueous/alcohol solvent solution. A solvent for the latter type of solution may contain from about 1% to 2% by volume (vol. %) to about 30 vol. % deionized water with the remainder of the solution being a lower alcohol, such as methanol, ethanol, isopropanol, or the like. The solvent is combined with the silane and glacial acetic acid to establish a pH of about 4 to 6. The concentration of the silane compound is not relevant as long as the silane remains in solution during application. Generally, the solution will include about 1% to about 20% silane, which may be measured either by volume or by weight in this concentration range.

The binder 38 of layer 40 applied to gas turbine engine component 10 is allowed to dry and then is heated, such as with a heat gun (not shown) or in a heated enclosure (not shown), to a temperature suitable to release or remove solvent from the binder 38 and provide a solid or semisolid cured state. Before curing, the layer 40 on the convex airflow surface 18 may first be allowed to dry, such as underneath a lamp (not shown), to partially remove the constituent solvent. Generally, the layer 40 is applied in an amount of about 0.01 g/cm$^2$ to about 2.0 g/cm$^2$. Multiple layers 40 of liquid or solution may be applied to convex airflow surface 18, each individual layer 40 being dried and heated before applying the next successive layer 40. As used herein, the layer 40 may refer to either the initially applied layer of liquid or solution or, without limitation, to the cured or dried layer that has had solvent removed from binder 38 by heating and/or air curing at room temperature.

The particles 44 of layer 40 constituting the roughening agent may advantageously be composed of a ceramic, such as silica, alumina, chromium dioxide, yttria, hafnia, zirconia, and combinations and mixtures thereof. For example, the particles 44 may be a fine alumina flour having a mesh size on the order of 270 to 325 mesh or finer. Alternatively, the particles 44 may include a metal, such as boron, aluminum, chromium, yttrium, hafnium, zirconium, and combinations and alloys thereof. Alternatively, the particles 44 may be a metallic powder comprised of metallurgy identical to the base metal constituting a substrate 46 of the gas turbine engine component 10 and with an optional addition of less than about 1% by weight of boron powder. Preferably, the layer 40 is not allowed to infiltrate into the cooling holes 26 during application to the gas turbine engine component 10. The binder 38 of layer 40, after curing, secures the particles 44 to the airflow surface 18 during the aluminiding process. The invention contemplates other types or compositions of binders 38, which may lack a silicon content, may be used to retain the dispersed particles 44 on airflow surface 18 before aluminiding.

With reference to FIG. 2, a CVD apparatus 50 suitable for use in forming the aluminide coating 42 (FIG. 4) includes a main reaction chamber 54 enclosing the interior space defining a deposition environment 52 when purged of atmospheric gases, and evacuated. Inert gas, such as argon, is supplied from a gas supply 56 to the reaction chamber 54 through an inlet port 58 defined in the wall of chamber 54. An exhaust port 60 defined in the wall of the reaction chamber 54 is coupled with a vacuum pump 62 capable of evacuating the reaction chamber 54 to a vacuum pressure. One or more gas turbine engine components 10 are introduced into the reaction chamber 54 and are situated away from a source of extrinsic metal, as explained below.

Positioned within the reaction chamber 54 is a mass or charge of a solid donor material 64, a mass or charge of an activator material 66, and several gas turbine engine components 10. Suitable solid donor materials 64 include alloys of chromium and aluminum, which are preferably low in sulfur content (<3 ppm sulfur). One suitable donor material 64 is 44 wt % aluminum and balance chromium. Appropriate activator materials 66 suitable for use in the invention include, but are not limited to, aluminum fluoride, aluminum chloride, ammonium fluoride, ammonium chloride, and ammonium bifluoride. The reaction chamber 54 is heated to a temperature effective to cause vaporization of the activator material 66, which is transported as diagrammatically indicated by arrows 65 within the deposition environment 52 to the solid donor material 64. Typically, this temperature ranges from about 1950° F. to about 2000° F. Interaction between the vaporized activator material 66 and the solid donor material 64 promotes the release of a vapor phase reactant from the solid donor material 64. This vapor contains an extrinsic metal, typically aluminum, that contributes a first extrinsic metal for incorporation into an aluminide coating 42 (FIG. 4) formed on component 10, as diagrammatically indicated by arrows 68. The extrinsic metal is separate, distinct, and independent from the material comprising the gas turbine engine component 10 and any coating preapplied to component 10.

Figure 3A:
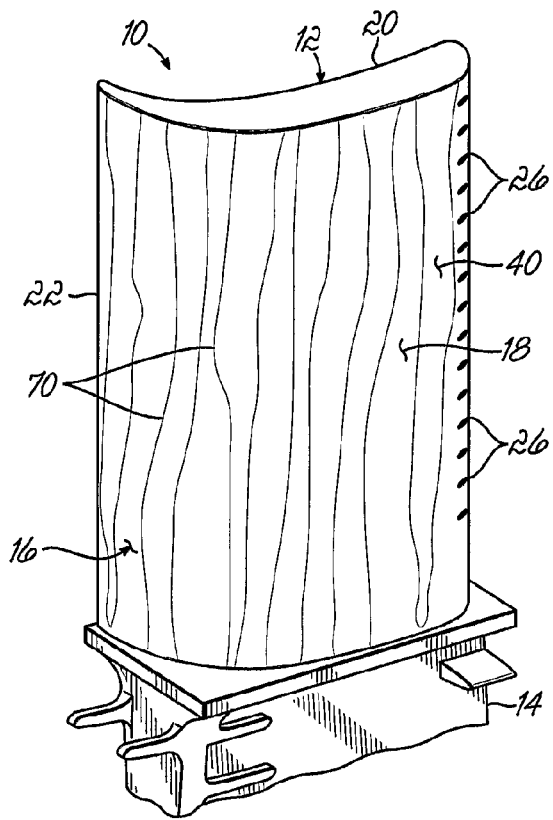
FIGS. 3A-C are perspective views similar to FIG. 1 in accordance with alternative embodiments of the invention.
Figure 3B:
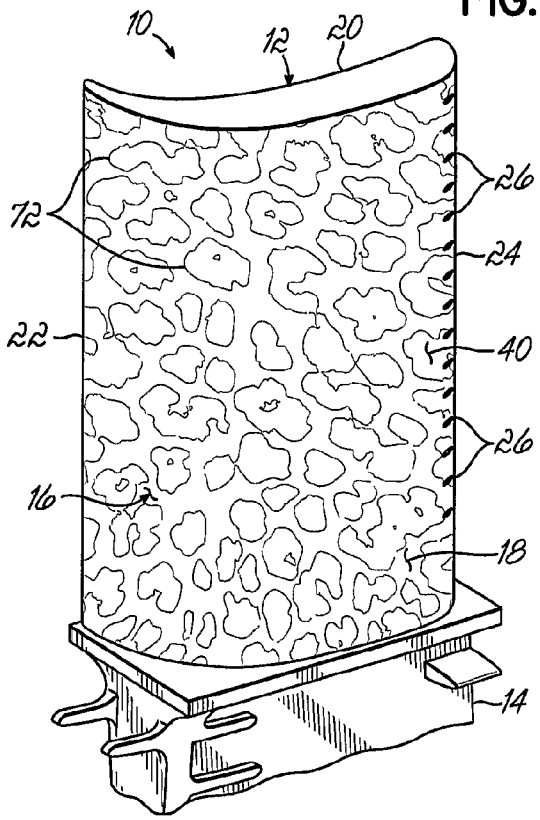
Figure 3C:
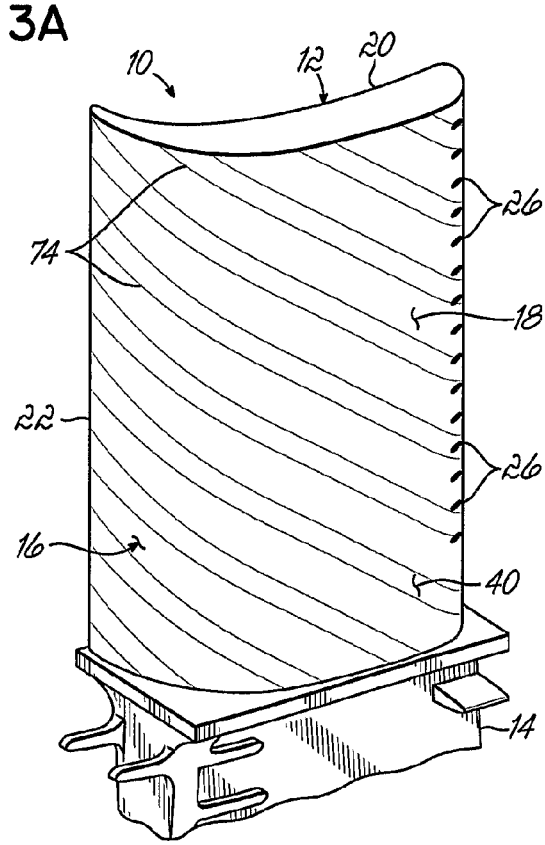

With reference to FIGS. 3A-C in which like reference numerals refer to like features in FIG. 2 and in accordance with alternative embodiments of the invention, layer 40 may be provided on only selected regions of the convex airflow surface 18. As shown in FIG. 3A, layer 40 may be applied in discrete areas distributed across the convex airflow surface 18 as a plurality of substantially-parallel stripes 70 having either smooth edges or jagged, uneven edges. The stripes 70 of layer 40 are aligned substantially parallel to the leading and trailing edges 22, 24 that bound the airflow surface 18.

As shown in FIG. 3B, layer 40 may be applied across the convex airflow surface 18 in discrete areas defined by a plurality of discrete islands or areas 72 arranged either randomly or in specific rows and/or columns. The peripheral boundary surrounding the discrete areas 72 of layer 40 may be irregular, as shown, angular, curvilinear, regular (e.g., circular), or a distribution of different shapes.

As shown in FIG. 3C, the layer 40 may be applied across the convex airflow surface 18 as a pattern of substantially-parallel stripes 74 inclined diagonally across the convex airflow surface 18. The resultant airflow path is believed to occur in channels defined between adjacent stripes 74 and is directed toward the root 14 of the component 10, which represents a non-airflow surface. Each of the stripes 74 of layer 40 intersects at least one of the first and second edges 22, 24 that bound the airflow surface 18. This particular pattern for layer 40 may cause the air in airflow path 13 to twist as it tumbles through the gas turbine engine (not shown).

Figure 4:
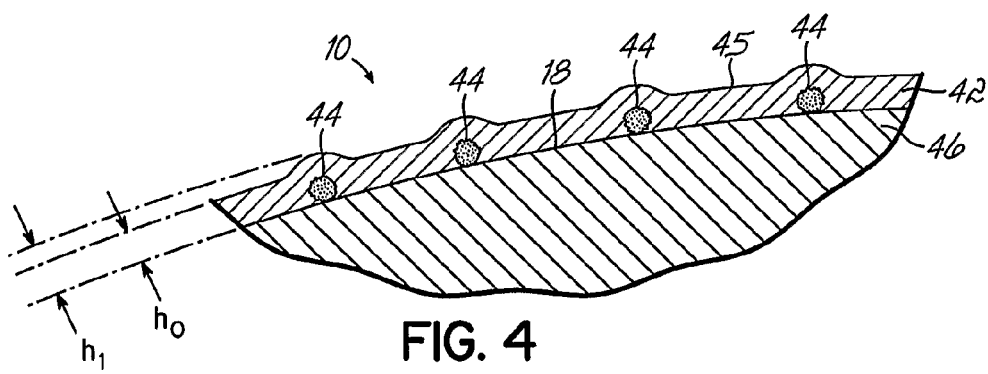
FIG. 4 is a diagrammatic cross-sectional view of a portion of a coated gas turbine engine component of the present invention.

With reference to FIG. 4, the aluminide coating 42 is formed on a metallic substrate 46 of the gas turbine engine component 10 across at least the airflow surfaces 18, 20. The aluminide coating 42 on the convex airflow surface 18 on areas with the pre-applied layer 40 will include the particles 44 and may include one or more elements from the binder 38 (FIG. 1A). The spatial distribution of the particles 44 determines the topography of the aluminide coating 42 in these areas. Advantageously, the viscosity of the binder 38 is sufficient to cover the particles 44 so that the particles 44 are buried or submerged in the binder 38 before aluminiding.

The particles 44 operate to effectively increase the surface roughness of the aluminide coating 42 in comparison with adjacent portions of convex airflow surface 18, if any, lacking layer 40 before aluminiding. Particles 44 create raised or elevated surface irregularities or mounds in the aluminide coating 42 at distributed locations across the convex airflow surface 18. This difference in surface finish is best apparent from FIG. 4 as areas of the aluminide coating 42 proximate or local to each particle 44 will have an average thickness of $h_1$, as compared to the nominal thickness, $h_0$, of the aluminide coating 42 in regions between adjacent particles 44 and not affected by the presence of the particles 44. Of course, the increase in average surface roughness will also reflect the number or density of particles 44 and will statistically include portions of aluminide coating 42 overlying the particles 44 and having local effective thicknesses ranging between $h_1$ and $h_0$ due to the mounding. The thickness $h_0$ may be thicker than the thickness of the aluminide coating 42 formed on other surfaces of the gas turbine engine component 10, such as on concave airflow surface 20, because of the presence of silicon originating from binder 38.

The particles 44 remain substantially intact after the aluminiding process forming the aluminide coating 42. Preferably, the particles 44 originally dispersed in the pre-applied layer 40 are incorporated into the aluminide coating 42 without significant degradation by the aluminiding process or at the temperature of the aluminiding process. The number of particles 44 dispersed in the aluminide coating 42 is effective to provide the aluminide coating 42 with a desired surface roughness. The value of the average or peak surface roughness is contingent upon, among other parameters, the size, shape, distribution, and number of particles 44 dispersed in the aluminide coating 42. Preferably, the surface finish of aluminide coating 42 has an average surface roughness ($R_A$) greater than a conventional surface finish, considered to lack particles similar to particles 44, of about 68 microinches. Advantageously, the average surface roughness of aluminide coating 42 is greater than about 75 microinches. More advantageously, the average surface roughness of aluminide coating 42 is greater than about 100 microinches. Most advantageously, the particles 44 influence the aluminide coating 42 to provide an average surface roughness that ranges from about 120 microinches to about 130 microinches.

The particles 44 are illustrated in FIG. 4 as having a substantially uniform size. However, the invention is not so limited as particles 44 may have a distribution of sizes with a size range effective provide the desired surface finish on airflow surface 20. The particles 44 are illustrated in FIG. 4 as being approximately spherical. However, the invention is not so limited as particles 44 may have other appropriate three-dimensional geometrical shapes, such as elongated cylinders, rods, needles, pyramids, etc. The particles 44 are illustrated in FIG. 4 as being positioned approximately at the position of the original concave airflow surface 18. However, the invention is not so limited as particles 44 may be positioned with a distribution of locations across the thickness of aluminide coating 42 between the surfaces 18 and 45.

In this specific embodiment of the present invention, aluminide coating 42 operates as an environmental coating having a working surface 45 exposed to the atmosphere with the gas turbine engine component 10 in service. The general composition of aluminide coating 42 in regions of the convex airflow surface 18 initially covered by layer 40 may advantageously include a concentration of silicon if the binder 38 contains silicon. In this instance, the concentration of silicon in the aluminide coating 42 may be, for example, about 0.5 percent by weight (wt %).

The presence of silicon in the aluminide coating 42 may also increase the thickness of the aluminide coating 42 in regions of the convex airflow surface 18 initially covered by layer 40, in comparison with the aluminide coating 42 on regions of the convex airflow surface 18 not initially covered by layer 40. This increased comparative thickness may also effectively contribute to the roughening of the convex airflow surface 18 if the layer 40 is applied to selected regions, as shown for example in FIGS. 3A-C.

Figure 4A:
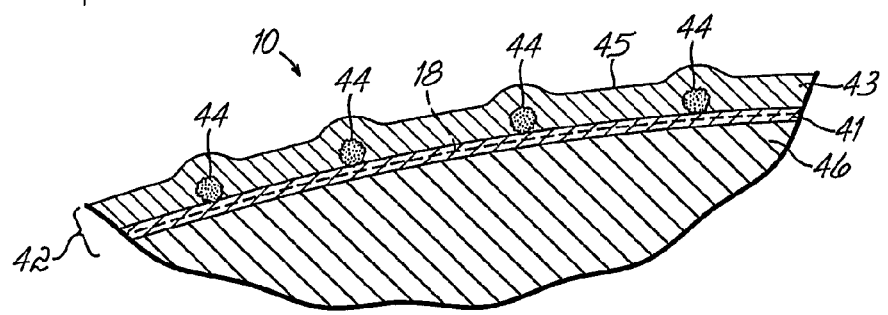
FIG. 4A is a diagrammatic cross-sectional view of a portion of a coated gas turbine engine component in accordance with an alternative embodiment of the present invention.

With reference to FIG. 4A, the invention contemplates aluminide coating 42 may partially diffuse into the substrate 46 beneath the original convex airflow surface 18 of the substrate 46, instead of being a purely additive layer as shown in FIG. 4. The resulting aluminide coating 42 includes a diffusion region 41 that extends beneath the formed position of the original convex airflow surface 18 and an additive region 43 overlying the former position of the original convex airflow surface 18. In this instance, the outermost boundary of the additive region 43 defines the working surface 45 of aluminide coating 42 when the gas turbine engine component 10 is in service. Additive region 43 is an alloy that includes a relatively high concentration of the donor metal aluminum and a concentration of a metal, for example nickel, from substrate 46 outwardly diffusing from component 10. By contrast, diffusion region 41 has a lower concentration of aluminum and a relatively high concentration of the metal of substrate 46.

The present invention may be used in combination with the application of a platinum aluminide coating on gas turbine engine component 10. In this instance, layer 40 is placed on the gas turbine engine component 10 after the coating of platinum but before aluminiding.

The aluminide layer 42 containing particles 44 may also be formed on gas turbine engine components 10 including the silicon-containing layer 30 by various alternative techniques known in the art, including but not limited to dynamic CVD and pack coating deposition processes such as an above-the-pack process or an in-the-pack process or by electrospark deposition or alloying.

The present invention is generally applicable to turbine engine components 10 used in the gas turbines of jet engines, the gas turbines of industrial gas turbine engines, or in other turbomachinery. In particular, the present invention is applicable for roughening turbine blades in such engines and, more particularly, for roughening turbine blades in the gas turbines used in jet engines.

While the present invention has been illustrated by the description of an embodiment thereof and specific examples, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of applicant's general inventive concept.

Having described the invention, what is claimed is:

1. A gas turbine engine component (10) comprising:
   a superalloy substrate (46) including an airflow surface (18); and
   an aluminide coating (42) on at least a portion of the airflow surface (18) for direct contact with hot exhaust gases when the component is in service, the aluminide coating (42) including an effective number of substantially intact particles (44) dispersed therein such that the aluminide coating (42) has a desired surface roughness, wherein the particles (44) are distributed in separated discrete areas (72) across the airflow surface (18).

2. The gas turbine engine component of claim 1 wherein the particles (44) include a ceramic selected from the group consisting of silica, alumina, chromium dioxide, yttria, hafnia, zirconia, and combinations and mixtures thereof.

3. The gas turbine engine component of claim 1 wherein the particles (44) include a metal selected from the group consisting of boron, aluminum, chromium, yttrium, hafnium, zirconium, and combinations and alloys thereof.

4. The gas turbine engine component of claim 1 wherein some of the particles (44) are composed of a superalloy material composition and some of the particles (44) are composed of boron.

5. The gas turbine engine component of claim 1 wherein the airflow surface (18) is bounded between first and second edges (22, 24), and the discrete areas are arranged as a plurality of stripes (70) aligned substantially parallel to the first and second edges (22, 24).

6. The gas turbine engine component of claim 1 wherein the airflow surface (18) is bounded between first and second edges (22, 24), and the discrete areas are arranged as a plurality of stripes (74) that intersect at least one of the first and second edges (22, 24).

7. The gas turbine engine component of claim 1 wherein the desired surface roughness of the aluminide coating (42) is greater than about 68 microinches.

8. The gas turbine engine component of claim 1 wherein the desired surface roughness of the aluminide coating (42) is greater than about 75 microinches.

9. The gas turbine engine component of claim 1 wherein the desired surface roughness of the aluminide coating (42) is greater than about 100 microinches.

10. The gas turbine engine component of claim 1 wherein the desired surface roughness of the aluminide coating (42) ranges from about 120 microinches to about 130 microinches.

11. The gas turbine engine component of claim 1 wherein the airflow surface portion has a convex curvature.

12. The gas turbine engine component of claim 1 wherein the component is a turbine blade.

13. The gas turbine engine component of claim 12 wherein the turbine blade is adapted to be coupled with a jet engine.

14. The gas turbine engine component of claim 1 wherein the superalloy substrate (48) is composed of a nickel-based superalloy.

15. A gas turbine engine component comprising:
a superalloy substrate including an airflow surface having a first surface portion and a second surface portion;
a first aluminide coating on the first surface portion having a first desired surface roughness; and
a second aluminide coating on the second surface portion including an effective number of substantially intact particles such that the second aluminide coating has a second desired surface roughness that is greater than the first desired surface roughness, the second aluminide coating being distributed in separated discrete areas across the airflow surface, the first aluminide coating and the second aluminide coating each forming a portion of a working surface of the component for direct exposure to hot exhaust gases when the component is in service.

16. The gas turbine engine component of claim 15 wherein the second aluminide coating contains silicon not present in the first aluminide coating.

17. The gas turbine engine component of claim 15 wherein the component is a turbine blade.

18. The gas turbine engine component of claim 17 wherein the turbine blade includes a convex airflow surface portion and a concave airflow surface portion, and wherein the second surface portion forms at least a portion of the convex airflow surface portion.

19. The gas turbine engine component of claim 18 wherein the first surface portion forms at least a portion of the concave airflow surface portion.

20. The gas turbine engine component of claim 19 wherein the first desired roughness is less than or equal to about 68 microinches.

\* \* \* \* \*